May 22, 1951     O. J. SWENSON     2,554,073
METHOD OF EXTRACTING WAX FROM CACHAZA
Filed May 29, 1947

INVENTOR
Oscar J. Swenson
BY Robert J. Leahy
ATTORNEY

Patented May 22, 1951

2,554,073

UNITED STATES PATENT OFFICE 2,554,073

METHOD OF EXTRACTING WAX FROM CACHAZA

Oscar J. Swenson, Ithaca, N. Y., assignor to The Cuban-American Sugar Company, New York, N. Y., a corporation of New Jersey, and S. C. Johnson & Son, Inc., Racine, Wis., a corporation of Wisconsin Application May 29, 1947, Serial No. 751,441

4 Claims. (Cl. 260—412.4)

This invention relates to a method of extracting wax and apparatus therefore. More particularly, it relates to a novel method for extracting wax from sugar mill press cake, more generally known as cachaza and a novel vertical type extractor for use therewith.

Cane wax is present on the outer surface of the stalk in all varieties of sugar cane. Various methods for obtaining this wax have been proposed, as by scraping the stalk with a sharp instrument, and by passing the stalks through a bath of water heated sufficiently to melt the wax prior to pressing. Rosales suggested drying the cachaza as dry as possible before extracting the wax. However, none of these proposals have proven to be practical.

Cachaza is generally filtered either through a plate-and-frame filter, or a rotary vacuum filter, and the sucrose content recovered. Generally, a filter aid such as bagacillo is used with the rotary vacuum filter which results in a more porous filter cake from which the sucrose content may be more efficiently removed.

The previous history of commercial cane wax extraction has been that interest revives during wartime when well-known waxes become scarce, but dies down when the other waxes become available. I have recently been making commercial experiments in extracting cane wax using a horizontal type extractor. In this type of extractor solvent flows horizontally over the cachaza in an unbroken stream with ample opportunity to by-pass it, and all contact between the solvent and the interior of the cachaza must be effected by the mixing action of the agitator paddles which are rendered less effective by the tendency of relatively heavy cachaza to settle out of the solvent. My experiments have shown that this type of extractor does not accomplish the intimate mixing of the cachaza with the solvent essential to obtain the yields of wax necessary to make the extraction process economically sound.

I have, therefore, developed a new and novel method for extracting wax using a vertical type of extractor wherein cachaza in a fluid state is intimately contacted with a water-immiscible organic solvent, and the wax removed from the cachaza. I have also developed a novel vertical extractor particularly adapted for carrying out this method.

My invention, therefore, broadly stated is the method of extracting wax from cachaza comprising flowing fluid cachaza downward, with sufficient agitation to keep in fluid state through a wax extracting zone maintained at wax-extracting temperature, and traveling countercurrent to an upward moving, water-immiscible organic solvent, then removing the wax-enriched solvent from the wax-extracting zone, and recovering the wax from the wax-enriched solvent.

In addition, I have developed a novel wax extractor particularly adapted for carrying out this method comprising a closed vessel mounted vertically and having charge inlets and discharge outlets, a plurality of vertically spaced horizontal plates so constructed and positioned within said closed vessel as to provide a passageway alternately at the outside and center of the plates, and agitating means being provided. The agitating means includes a vertical shaft having a plurality of arms attached thereto, with each arm having a plurality of fingers. The agitating means is positioned immediately above each plate. The plates are preferably foraminous plates of alternately varying size having center apertures of alternately varying size, the larger plates having the larger center apertures. Shields are affixed to the plates and extend downward to define the passageway for the cachaza.

The invention will be understood by reference to the following description taken in connection with the accompanying drawing in which is shown a vertical type extractor particularly adapted for carrying out the method of this invention. While I have developed the extractor illustrated herewith for carrying out my novel method, it is to be understood that the method is not limited to this type of extractor alone. For example, the method may be carried out in a closed vertical vessel devoid of any horizontal plates, but provided with an indirect or tortuous path so that contacting of the solvent and the cachaza may be achieved.

The same reference numerals have been used for the designation of like parts throughout and in the drawing.

Figure 1:
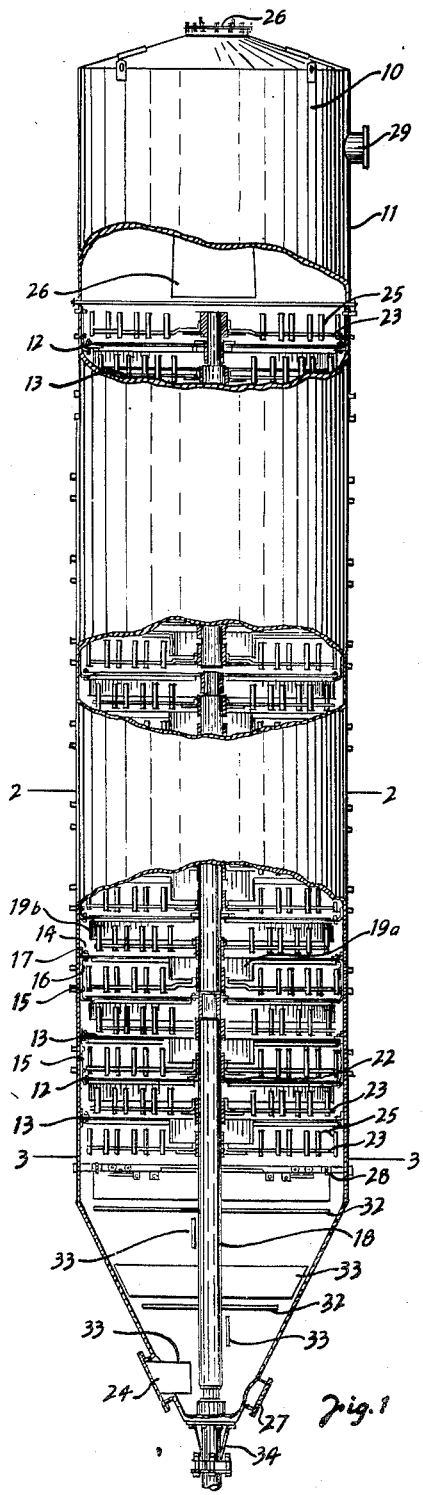
Figure 1 is a front view in elevation of the extractor with the parts broken away shown in cross section.
Figure 2:
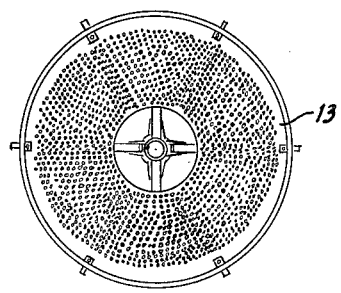
Figure 2 is a top plan view of a horizontal plate with a center passageway taken along the lines 2—2.

Referring more specifically to the drawing, the extractor 10 is a vertical type extractor consisting essentially of a closed steel cylindrical shell 11 mounted vertically and containing a plurality of foraminous horizontal steel plates 12 and 13, with a vertical shaft 18 positioned on the longitudinal axis of the cylindrical shell 11.

The plates 12 and 13 are positioned alternately throughout the extractor 10 and are affixed by means of bolts 14 to a bracket assembly 15 which in turn is secured to the cylindrical shell 11 by means of cap screws 16. A sealed ring 17 is positioned between the plate 13 and the inside wall of the cylindrical shell 11 to prevent fluid from passing between the plate 13 and the inside wall of the cylindrical shell 11. Around the center aperture of plate 13 is affixed a downwardly projecting cylindrical shield 19A to furnish a passageway for the flow of cachaza from plate 13 to plate 12 below.

The center aperture of plate 12 is closely fitted around the shaft 18. A loose-fitting washer 22 surrounds the shaft 18 and rests on the plate 12 so as to form a seal to prevent fluid from passing through the center aperture of plate 12. At a plurality of points around its periphery, plate 12 is affixed to bracket assemblies 15 by means of bolts 14 in such manner as to provide an opening between the plate 12 and the inside wall of the cylindrical shell 11 to permit the flow of cachaza from plate 12 to lower plate 13. Around the periphery of plate 12 is affixed a downwardly projecting cylindrical shield 19B which together with the inside wall of cylindrical shell 11 forms an annular passageway for the downward flow of cachaza from plate 12 to plate 13 below. It will be understood the size of the plates may vary, as well as the size of the passageways depending upon the size of the extractor, operating conditions and the like. It will also be understood that the number of plates may be varied. In the illustrated extractor twenty plates are used.

The vertical shaft 18 passes through the center apertures of the successive plates 12 and 13. To cause the cachaza to behave like a fluid and insure its flow, a plurality of horizontal metal agitator arms 23 are attached to the vertical shaft 18 by any suitable means. The arms 23 are provided with a plurality of fingers 25 adapted to agitate the cachaza on the plates 12 and 13. While the number of arms will vary, I have used four arms to provide the agitation on each plate in the illustrated extractor 10.

Figure 3:
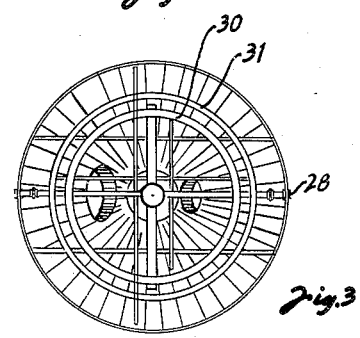
Figure 3 is a top plan view taken along the lines 3—3 showing the solvent distribution ring.
Figure 4:
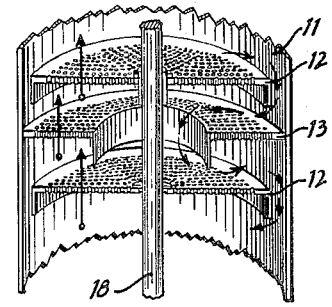
Figure 4 is a partial cross-sectional view in perspective showing the path of the cachaza and of the solvent as it flows through the extractor.

The extractor 10 is provided with a cachaza charge inlet 26 and cachaza discharge outlet 27. A manhole 24 is provided for inspection. The extractor 10 is further provided with a solvent charge inlet 28 and a solvent-wax discharge outlet 29. Figure 3 illustrates the solvent distribution ring 30 as well as showing a steam ring 31 which can be used to furnish supplementary heat, if desired. The bottom of the extractor 10 below the solvent charge inlet 28 is preferably in the form of an inverted cone, and is provided with a plurality of stirring arms 32 which are affixed to the vertical shaft 18. Below the stirring arms 32 are positioned stationary baffles 33. The vertical shaft 18 is provided with a stuffing box assembly 34. The source of power for driving the shaft 18 is not shown.

In operating the extractor 10, a hot solvent, preferably heptane because of its availability and low cost, is introduced into the base of the extractor 10 through a solvent charge inlet 28, and being of lower density than the cachaza, the heptane passes upward successively through the perforations in the foraminous horizontal steel plates 12 and 13, and the layer of cachaza above each plate. The cachaza is introduced in the fluid state into the extractor 10 through a cachaza charge inlet 26. The cachaza then descends through the annular passageway provided at the outside periphery of uppermost plate 12 to plate 13 below. It then flows radially inward toward the center of plate 13 passing downward through the passageway provided at the center of plate 13 to plate 12 below. It then flows radially outward on this plate 12 and descends through the annular passageway provided at the outside periphery of this plate 12 to plate 13 below. Thereafter the cachaza flows downward through the successive plates repeating the cycle described above. The cachaza acts as a piston at each plate to force the heptane upward through the foraminous openings in each plate, the heptane being the discontinuous phase. As the heptane issues through the foraminous openings of any particular plate, it is met by the agitator arm 23 and thoroughly mixed with the cachaza which is flowing radially across the plate, thereby providing good contact for effecting the extraction of the crude wax. The heptane carrying the extracted wax in solution as it reaches the top portion of the extractor 10 leaves the extractor through a solvent discharge outlet 29 and is then evaporated for recovery of its crude wax content as product by any suitable method.

After the cachaza has passed the extraction zone, it enters the bottom portion of the extractor 10 immediately below the solvent charge inlet 28 where it is agitated to assist in releasing entrained solvent. The extractor illustrated herewith is particularly designed so that the heptane content of the extracted cachaza is decreased progressively as the cachaza passes toward its discharge outlet 27. The purpose of this agitated zone is to reduce as far as possible the entrained heptane in the extracted cachaza before discharging it from the extractor 10.

The operating conditions in carrying out my method will vary over a wide range, preferably, however, the fluid cachaza introduced into the extractor 10 will ordinarily contain bagacillo as a filter aid and preferably will contain more than 85% moisture. The fluid cachaza as it enters the top of the extractor 10 is preferably around 175° F., the approximate mutual boiling point of water and heptane at atmospheric pressure. The heptane enters the bottom of the extractor 10 at about 230° F. and heats the cachaza or mud as it rises. It will be understood that extraction temperatures will vary in accordance with the solvent used, the type of extractor used, and the desired operating conditions. Generally, the temperature at which extraction may be carried out is upward of 100° F. and that temperature which is the boiling point of the mixture of solvent and fluid cachaza at the pressure under which cachaza is extracted. This latter temperature may be considered as the maximum.

The ratio of solvent to dry material may be from 0.5 lb. to 20 lbs., and is preferably from 2 to 8 lbs. of solvent per pound of dry material employed.

While heptane has been used in the description as the solvent for the wax, the invention is not so limited. Various water-immiscible organic solvents as hydrocarbons, more particularly aliphatic hydrocarbons, and especially a liquid petroleum fraction distilling completely at a temperature of about 230° F. may be used. In addition, other solvents may be used such as benzene, toluene, xylenes, hexanes, heptanes, octanes, nonanes, singly or in admixtures, saturated cyclic hydrocarbons, as cyclohexane, and chlorinated hydrocarbons, as for example, butyl chloride and amyl chloride. Other solvents may be used, such as, lower alkyl acetates and propionates having from 1 to 5 carbon atoms, such as, methyl, ethyl, propyl, butyl and amyl derivatives. In choosing a solvent for the wax, not only should the solvent power for wax be considered, but availability, cost and the like should be considered.

While I have disclosed herein a novel method and apparatus for extracting wax, attention is directed to the following related applications which I am filing simultaneously with this application as follows:

I have disclosed and claimed a complete system of extracting wax from cachaza wherein the step of extracting wax through a vertical extractor is claimed in combination with several other steps in my co-pending application S. N. 751,442, filed May 29, 1947, in the United States Patent Office. This application was issued on May 16, 1950, as U. S. Patent No. 2,508,002.

I have specifically claimed the method and apparatus for mixing and heating solid cachaza to convert it to the fluid state prior to its introduction into the extractor in my co-pending application S. N. 751,440, filed May 29, 1947, in the United States Patent Office.

I have specifically claimed the method and apparatus for stripping solvent from the extracted cachaza after it leaves the extractor in my co-pending application S. N. 751,439, filed May 29, 1947, in the United States Patent Office which is now abandoned.

Other modes of applying the principle of the invention may be employed instead of those explained, changes being made as regards the method or apparatus herein disclosed provided the steps or elements stated by any of the following claims or the equivalent of such stated steps or elements be employed.

I claim:

1. A method of extracting wax from cachaza comprising flowing fluid cachaza downward, with sufficient agitation to keep in fluid state through a wax-extracting zone maintained at wax-extracting temperature, and traveling countercurrent to upward moving water-immiscible organic solvent, removing the wax-enriched solvent from said wax-extracting zone, and recovering wax from said wax-enriched solvent.

2. A method of extracting wax from cachaza comprising continuously flowing fluid cachaza downward, with sufficient agitation to keep in fluid state through a wax-extracting zone maintained at wax-extracting temperature, and traveling countercurrent to continuously upward moving water-immiscible organic solvent, continuously removing the wax-enriched solvent from said wax-extracting zone, and recovering wax from said wax-enriched solvent.

3. A method of extracting wax from cachaza comprising flowing fluid cachaza downward, with sufficient agitation to keep in fluid state through a wax-extracting zone maintained at wax-extracting temperature, and traveling countercurrent to upward moving heptane, removing the wax-enriched heptane from said wax-extracting zone, and recovering wax from said wax-enriched heptane.

4. A method of extracting wax from cachaza comprising continuously flowing fluid cachaza downward, with sufficient agitation to keep in fluid state through a wax-extracting zone maintained at wax-extracting temperature, and traveling countercurrent to continuously upward moving heptane, continuously removing the wax-enriched heptane from said wax-extracting zone, and recovering wax from said wax-enriched heptane.

OSCAR J. SWENSON.

REFERENCES CITED

The following references are of record in the file of this patent:

UNITED STATES PATENTS

| Number | Name | Date |
| --- | --- | --- |
| 2,150,608 | Olier | Mar. 14, 1939 |
| 2,375,142 | Sklar | May 1, 1945 |
| 2,381,965 | Berry | Aug. 14, 1945 |
| 2,428,813 | Rhodes et al. | Oct. 14, 1947 |